United States Patent
Saxena et al.

(10) Patent No.: US 8,744,858 B2
(45) Date of Patent: Jun. 3, 2014

(54) SYSTEM AND METHOD FOR VOICE BASED DIGITAL SIGNATURE SERVICE

(75) Inventors: Ashutosh Saxena, Hyderabad (IN); Vishal Anjaiah Gujjary, Hyderabad (IN); Harigopal K.B. Ponnapalli, Hyderabad (IN)

(73) Assignee: Infosys Limited, Bangalore (IN)

( * ) Notice: Subject to any disclaimer, the term of this patent is extended or adjusted under 35 U.S.C. 154(b) by 299 days.

(21) Appl. No.: 13/246,767

(22) Filed: Sep. 27, 2011

(65) Prior Publication Data
US 2013/0006642 A1    Jan. 3, 2013

(30) Foreign Application Priority Data
Jun. 29, 2011 (IN) .......................... 2192/CHE/2011

(51) Int. Cl.
G10L 21/00 (2013.01)
(52) U.S. Cl.
USPC .......................... 704/273; 704/272; 704/270
(58) Field of Classification Search
USPC .............. 704/235, 246, 250, 270, 272, 270.1, 704/273, 3, 7, 9, 231; 705/51, 75
See application file for complete search history.

(56) References Cited

U.S. PATENT DOCUMENTS

| | | | |
|---|---|---|---|
| 6,954,740 B2 * | 10/2005 | Talker | 705/75 |
| 7,606,768 B2 * | 10/2009 | Graubart et al. | 705/51 |
| 7,958,540 B2 | 6/2011 | Saxena | |
| 8,306,932 B2 | 11/2012 | Saxena et al. | |
| 8,464,339 B2 | 6/2013 | Kanduri et al. | |
| 8,504,532 B2 | 8/2013 | Saxena et al. | |
| 8,516,563 B2 | 8/2013 | Saxena et al. | |
| 8,590,026 B2 | 11/2013 | Kumar et al. | |
| 8,590,028 B2 | 11/2013 | Saxena et al. | |
| 2008/0262968 A1 | 10/2008 | Saxena et al. | |
| 2009/0150983 A1 | 6/2009 | Saxena et al. | |
| 2010/0082494 A1 | 4/2010 | Saxena | |
| 2011/0099107 A1 | 4/2011 | Saxena et al. | |
| 2011/0162054 A1 | 6/2011 | Saxena et al. | |
| 2011/0209076 A1 | 8/2011 | Saxena et al. | |
| 2011/0231801 A1 | 9/2011 | Saxena et al. | |
| 2011/0321120 A1 | 12/2011 | Saxena et al. | |
| 2011/0321144 A1 | 12/2011 | Saxena et al. | |
| 2011/0321164 A1 | 12/2011 | Saxena et al. | |
| 2012/0005169 A1 | 1/2012 | Saxena et al. | |
| 2012/0166409 A1 | 6/2012 | Saxena et al. | |
| 2012/0254041 A1 | 10/2012 | Saxena et al. | |
| 2013/0227661 A1 | 8/2013 | Gupta et al. | |
| 2013/0305376 A1 | 11/2013 | Chauhan et al. | |
| 2014/0047557 A1 | 2/2014 | Veerubhotla et al. | |
| 2014/0047558 A1 | 2/2014 | Veerubhotla et al. | |

\* cited by examiner

*Primary Examiner* — Huyen X. Vo

(74) *Attorney, Agent, or Firm* — Klarquist Sparkman, LLP

(57) ABSTRACT

Methods and systems for providing a voice-based digital signature service are disclosed. The method includes a first user sending a document to a second user for signature, and the first user also sending a PIN to the second user and to a voice verification authority. The second user sending, to the voice verification authority, a voice recording comprising the PIN along with consent of the second user to the PIN. The voice verification authority comparing the voice recording with a predefined voice sample of the second user, and the PIN received from the first user with the PIN received from the second user. The voice verification authority then sending a notification to a signing entity based on the comparison. The signing entity signing the PIN of the document with a private key associated with the second user and sends an acknowledgement to the first user and the second user.

17 Claims, 5 Drawing Sheets

SYSTEM AND METHOD FOR VOICE BASED DIGITAL SIGNATURE SERVICE

CROSS REFERENCE TO RELATED APPLICATION

This application claims the benefit of and priority to prior Indian patent application number 2192/CHE/2011, entitled "A SYSTEM AND METHOD FOR VOICE BASED DIGITAL SIGNATURE SERVICE," filed on Jun. 29, 2011, the entire disclosure of which is hereby incorporated herein by reference.

FIELD

The field relates generally to digital signature. In particular, the field relates to providing a voice-based digital signature service.

BACKGROUND

Traditional systems that use voice as a means of authentication have been in place and some problems for detecting unauthorized access have been addressed. Also, traditional methods using voice as a means for online transactions have been defined. Some existing solutions in this technological space use a unique voice print of a user to create a digital signature for authenticating a document. Security and non-repudiation for voice-over-IP (VoIP) conversations have also been addressed by existing solutions.

Many electronic transactions across the globe are conducted through the Internet, and for the same, buyers have a wide variety of devices such as a mobile phone, a smart phone, a PDA, a computer, and emerging mobile devices at their disposal. However, such a huge network installation has not been effectively used by the e-commerce industry causing service providers to play down their operational services to a narrow number.

Thus, although there are traditional tools and techniques that use voice as a means of authentication, these traditional tools and techniques are limited.

SUMMARY

The present disclosure discloses exemplary methods for providing a voice-based digital signature service. According to an exemplary method, a first user sends a document for signing to a second user. The first user also sends a PIN to the second user and to a voice verification authority. The second user sends a voice recording comprising at least the PIN along with his consent to the PIN to the voice verification authority. The voice verification authority compares the voice recording with a predefined voice sample of the second user. The voice verification authority also compares the PIN received from the first user with the PIN received from the second user. On successful match of the voice recording of the second user with the predefined voice sample of the second user and that of the PIN received from the first user with the PIN received from the second user, the voice verification authority sends a notification to a signing entity. The signing entity signs the document with a private key associated with the second user. Further, the signing entity sends an acknowledgement to the first user and the second user.

The present disclosure also discloses exemplary systems for providing a voice-based digital signature service. An exemplary system comprises a voice verification authority and a signing entity. The voice verification authority further comprises a database configured to store voice samples of one or more registered users and an authentication module. The authentication module receives a PIN from a first user, and a voice recording comprising the PIN along with consent of a second user to the PIN. The authentication module compares the voice recording with a predefined voice sample of the second user, and the PIN received from the first user with the PIN received from the second user. On successful match of the voice recording of the second user with the predefined voice sample of the second user and that of the PIN received from the first user with the PIN received from the second user, the authentication module sends a notification to a signing entity. The signing entity signs the document with a private key associated with the second user on receiving the notification from the authentication module. Further, the signing entity sends an acknowledgement to the first user and the second user that the document has been signed.

The foregoing and other objects, features, and advantages of the described technologies will become more apparent from the following detailed description, which proceeds with reference to the accompanying figures.

DETAILED DESCRIPTION

The following description includes the full and informative description of the best method and system presently contemplated for carrying out the presently described technologies which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique can be implemented with either greater or lesser specificity, depending on the needs of the user. Further, some of the features of the present technique can be used to get an advantage without the corresponding use of other features described in the following paragraphs. As such, the present description should be considered as merely illustrative of the principles of the present technique and not in limitation thereof, since the present technique is defined by the claims.

In existing solutions, mobile communication devices that are at the disposal of many people have not been used to provide a secure system that enables the use of voice to create a digital signature in documents. Also, network installations have not been effectively used by the e-commerce industry to provide interfaces between end users and enterprise systems. Thus what is needed is a solution wherein a voice signature can be bound to documents using wired or wireless devices with or without the aid of third party systems.

Figure 1:
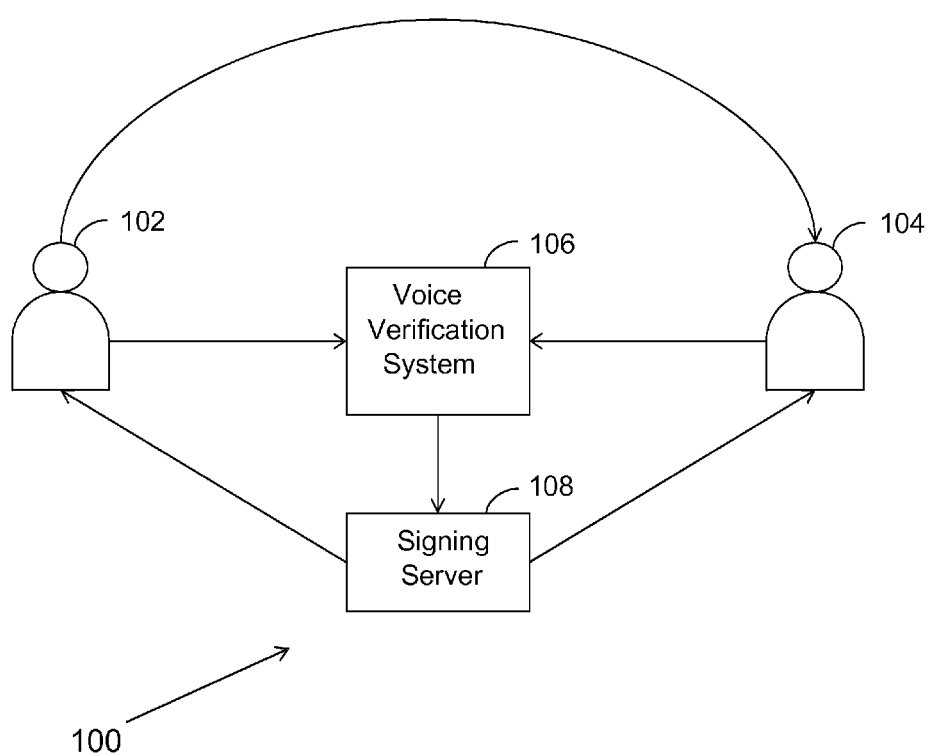
FIG. 1 shows an environment in which the herein described technologies can be practiced, in accordance with an embodiment of the described technologies.

Accordingly, FIG. 1 is a block diagram of an environment 100 in which the herein described technologies can be practiced, in accordance with an embodiment of the described technologies. Environment 100 includes a first user 102, a second user 104, a voice verification authority 106, and a signing entity 108.

In accordance with an embodiment of the herein described technologies, a first user 102 sends a document for signing to a second user 104. The first user 102 also sends a personal identification number (PIN) to the second user 104 and to a voice verification authority 106. The second user 104 sends a voice recording comprising at least the PIN along with his consent to the PIN to voice verification authority 106. The voice verification authority 106 compares the voice recording with a predefined voice sample of the second user 104. The voice verification authority 106 also compares the PIN received from the first user 102 with the PIN received from the second user 104. The voice verification authority 106 sends a notification to the signing entity 108 if there is a successful match for the above mentioned comparisons. The signing entity 108 signs the document with a private key associated with the second user 104. The signing entity 108 also sends an acknowledgement to the first user 102 and the second user 104.

In an exemplary embodiment of the herein described technologies, the first user 102 can be, for example, a beneficiary who needs an insurance policy to be signed by the second user 104. The first user 102 generates a PIN, which can be a hash on the document, using at least one (e.g. any) one-way hash function known in the art, and sends the PIN to the second user 104. The first user 102 can send the PIN to the second user 104 through a secure communication channel such as cellular phone, wired telephone, and the like. The first user 102 also sends the same PIN to voice verification authority 106. Further, the first user 102 sends the document along with its details to the second user 104 through an electronic channel such as the Internet, a mobile communication network, a telecommunication channel, a dedicated telecommunication wired channel or some other electronic channel. Various devices such as a computer or a wireless device such as a cellular phone, a personal digital assistant (PDA), a smart phone and the like can be used for communication through the electronic channel. The second user 104 can be, for example, a customer interested in the insurance policy. On receiving the document and the PIN, the second user 104 sends a voice recording to the voice verification authority 106. In an embodiment, the voice recording includes a phrase, which, in turn, can include a name of the second user 104, a date, a time, a consent of the second user 104 to the PIN received from the first user 102, and/or any other relevant document details. The second user 104 sends the voice recording comprising at least the PIN and the consent of the second user 104 to the PIN to voice verification authority 106 through one or more electronic channels (e.g. any electronic channel described).

The voice verification authority 106 compares the PIN received from the first user 102 with the PIN included in the voice recording received from the second user 104. The voice verification authority 106 also compares the voice recording received from the second user 104 with a predefined voice sample of the second user 104, which is available with the voice verification authority 106. Details of predefined voice samples are explained in conjunction with FIG. 2. The voice verification authority 106 sends a notification to the signing entity 108 when: a. the PIN received from the first user 102 matches the PIN included in the voice recording received from the second user 104, and b. the voice recording received from the second user 104 matches the predefined voice sample of the second user 104. In an exemplary embodiment, the notification sent to the signing entity 108 includes the PIN of the document to be signed by the signing entity 108. The notification can be sent through an electronic channel (e.g. any electronic channel) such as the Internet, a mobile communication network, a telecommunication channel, a dedicated telecommunication wired channel, or some other electronic channel.

The signing entity 108, on receiving the notification from the voice verification authority 106, signs the document with a private key associated with the second user 104. In an exemplary embodiment, the signing entity 108 stores the private key of users (e.g. every user) who have registered with the voice verification authority 106. Thus, based on the identity of the second user 102, the signing entity 108 fetches the private key associated with the second user 104 and uses this private key to sign the document. The signing entity 108 also sends an acknowledgement, which consists of the signed PIN, to the first user 102 and to the second user 104 to notify them that the document has been signed. Further, the signing entity 108 sends the document for verification to the first user 102. In an exemplary embodiment, the first user 102 can verify the signature on the document using a known public key of the second user 104. As will be apparent, communication between the signing entity 108 and other entities can take place through a secure electronic channel (e.g. any secure electronic channel).

Figure 2:
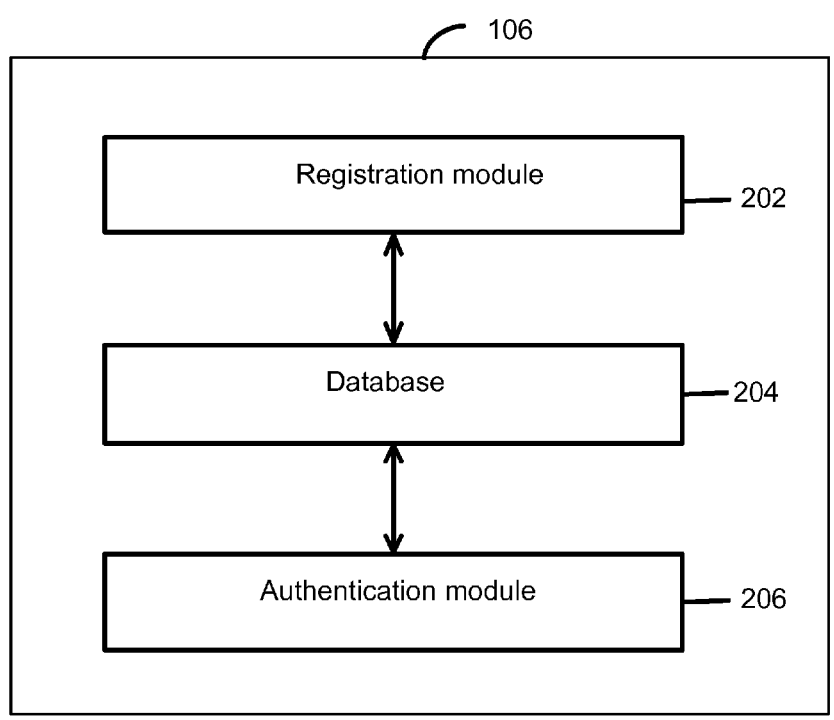
FIG. 2 is a block diagram of a voice verification authority, in accordance with an embodiment of the herein described technologies.

FIG. 2 is a block diagram of a voice verification authority 106, in accordance with an exemplary embodiment of the herein described technologies. The voice verification authority 106 includes a registration module 202, a database 204 and an authentication module 206.

In an exemplary embodiment, a user registers through registration module 202 before the user can use this system. Database 204 stores voice samples of users (e.g., all users) that have registered with voice verification system 106. The authentication module 206 compares PINs received from the first user 102 with the PIN included in a voice recording received from the second user 104. The authentication module 206 further compares the voice recording received from the second user 104 with the voice sample of the second user 104 stored in database 204. On successful match, authentication module 206 sends a notification to the signing entity, such as the signing entity 108, to sign the document.

As part of the registration process of the user with registration module 202, the user can provide a voice sample. The voice sample of the user, such as the second user 104, can include a pass-phrase such as a password, a sentence, or information related to the document, such as a beneficiary name, a date, a time, a intent, a PIN or combinations thereof. Based on characteristics (or frequencies) extracted from the voice sample, registration module 202 generates a feature template. Such a template can also be referred to as a voice print or voice signature, and can be unique to an individual. In one exemplary implementation, during the registration process, the end user can speak a few phrases and repeat each phrase several times, so that the created template is sufficiently reliable.

The database 204 stores the voice samples or recordings of the registered users along with the identities of the users for future retrieval and matching. The database 204 can also store the PINs received from the first user 102 and the second user 104, which are then sent to authentication module 206 for comparison.

The authentication module 206 performs a plurality of comparison operations. The authentication module 206 compares the PIN on the document received from a user, such as the first user 102, with the PIN included in the voice recording received from the second user 104. The authentication module 206 also compares the voice recording received from the second user 104 with the voice sample of the second user 104 stored in the database 204. On a successful match of the PINs received from the first user 102 and the second user 104, and on a successful match of the voice recording received from the second user 104 and the stored voice template of the second user 104, the authentication module 206 sends a notification to the signing entity 108. Thus, the authentication module 206 authenticates second user 104 and the PIN. The authentication module 206 then sends the notification, which consists of the PIN to be signed, to the signing entity 108.

Figure 3:
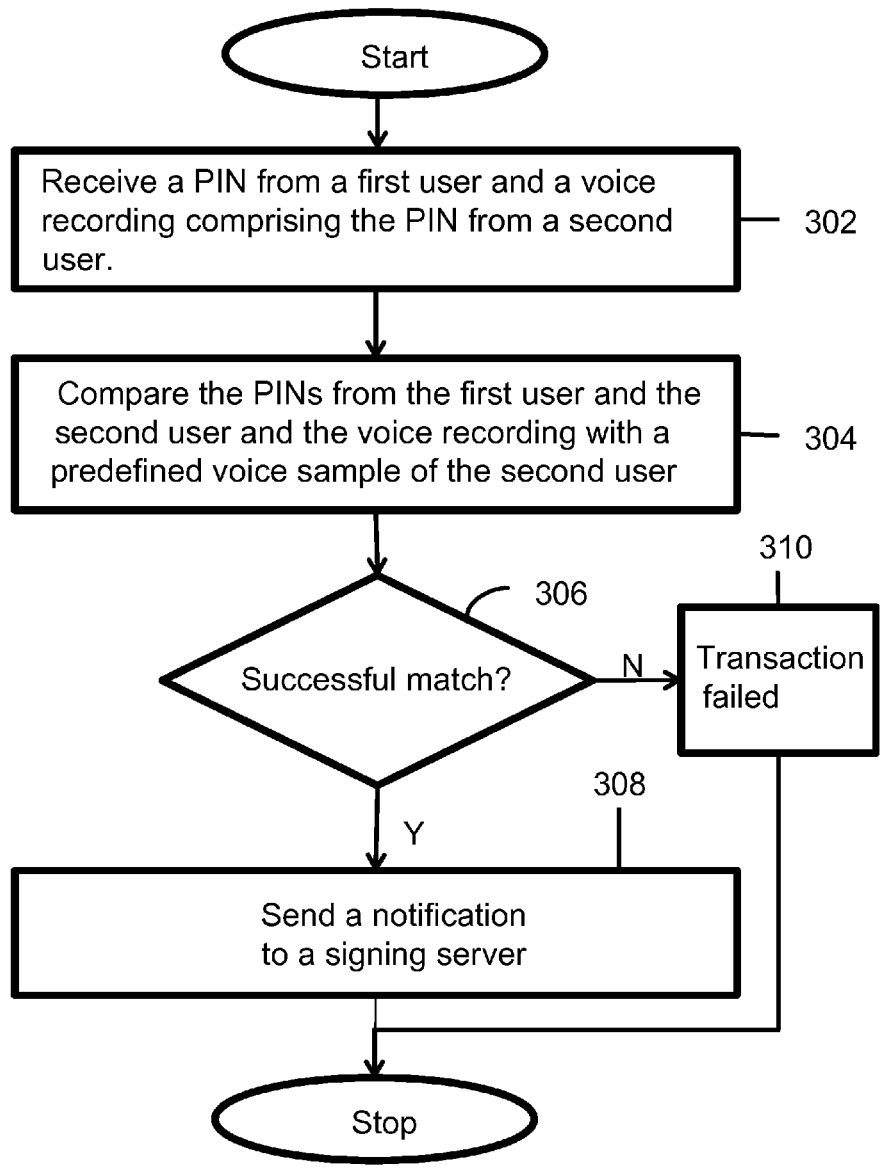
FIG. 3 is a flowchart describing a method for providing a voice-based digital signature service, in accordance with an embodiment of the herein described technologies.

FIG. 3 is a flowchart describing an exemplary method for providing a voice-based digital signature service.

At block 302, a voice verification authority receives a PIN from a first user, such as the first user 102, and a voice recording from a second user, such as the second user 104. In one exemplary embodiment, the voice recording includes at least a PIN and consent of the second user to the PIN. This information can be stored in a database.

At block 304, the voice verification authority performs two comparisons. The voice verification authority compares the PIN on the document received from the first user 102 and the PIN in the voice recording received from the second user 104. Further, it compares the voice recording received from the second user 104 with a predefined voice sample of the second user 104, stored in the database. The voice samples can be compared using a technique (e.g. any technique) known in the art. At block 306, the voice verification authority checks whether there is a match between the PINs received from the end users 102 and 104, and between the received voice template from the second user 104 and the stored voice template of the second user 104. If there is a match, the voice verification authority sends a notification to a signing entity, at block 308. However, if there is no match, at block 310, the transaction stops and no notification is sent to the signing entity.

Figure 4:
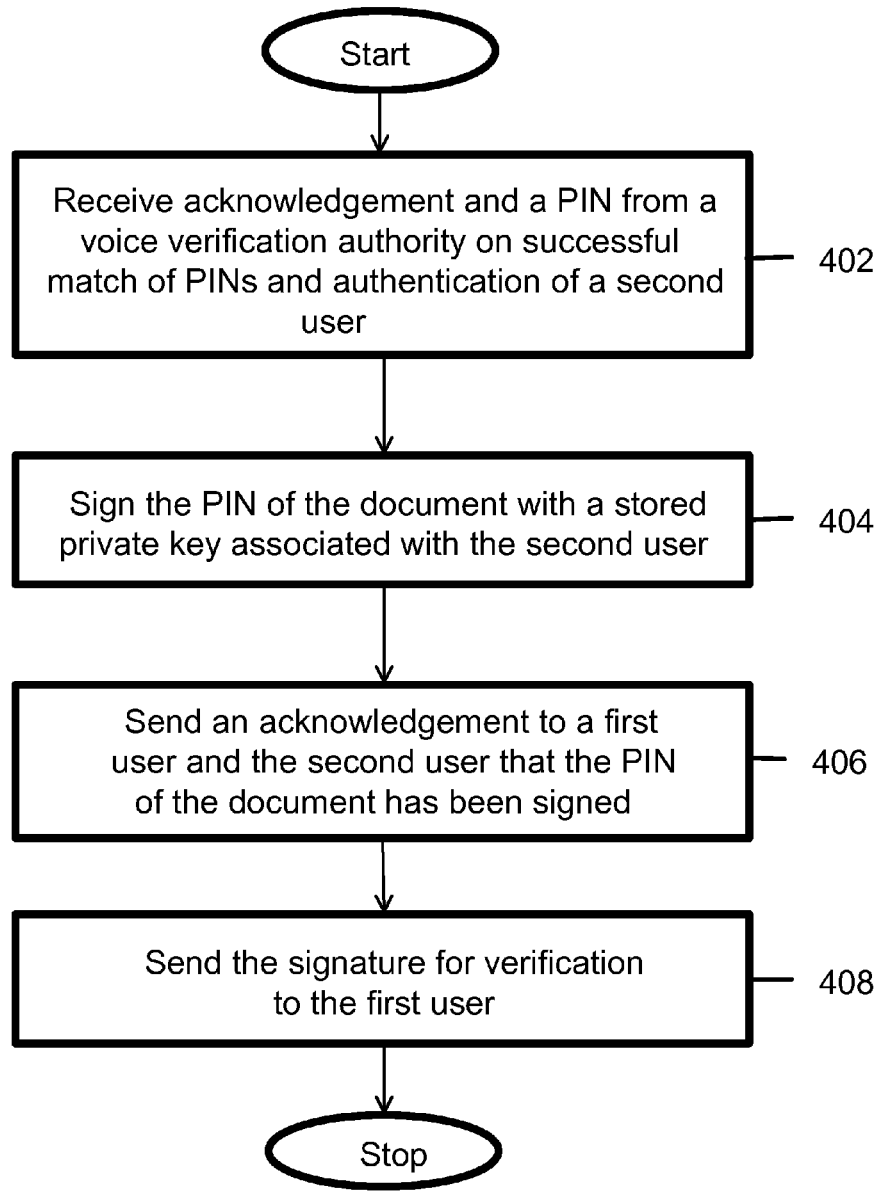
FIG. 4 is a flowchart describing a method for providing a voice-based digital signature service, in accordance with an embodiment of the herein described technologies.

FIG. 4 is a flowchart describing an exemplary method for providing a voice-based digital signature service.

At block 402, a signing entity, such as the signing entity 108, receives a notification that includes a PIN of a document from a voice verification authority 106.

At block 404, the signing entity signs the PIN of the document using a private key associated with the second user 104. The private keys corresponding to the registered users can be stored by the signing entity in a storage medium, such as a secure database or a hardware security module.

At block 406, the signing entity sends an acknowledgement comprising the signed PIN to the first user 102 and the second user 104, which states that the document has been signed.

At block 408, the signing entity sends the signature for verification to the first user 102. The first user 102 can verify the signature using a known public key of the second user 104.

Exemplary Computing Environment

Figure 5:
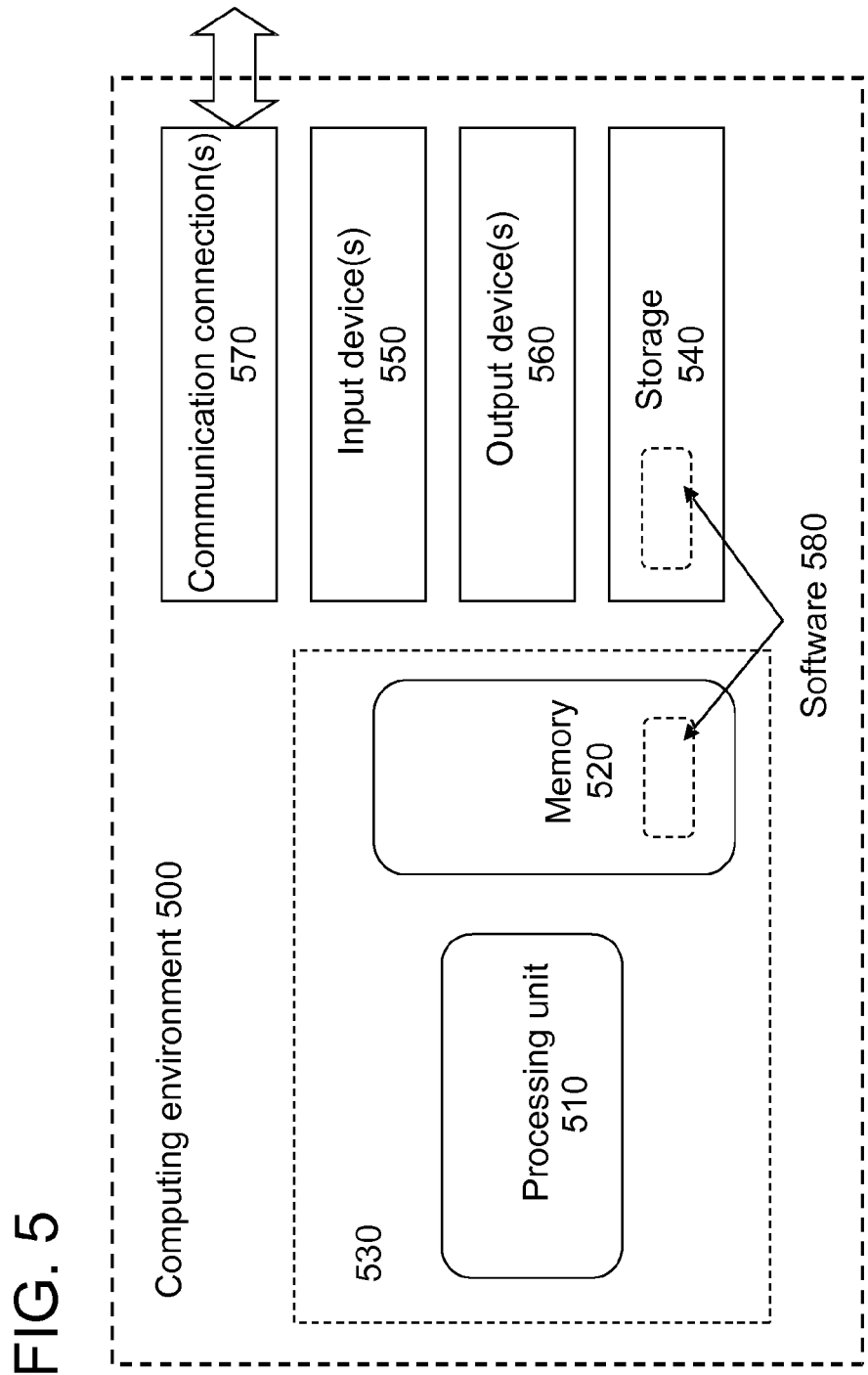
FIG. 5 illustrates a generalized example of a computing environment for any of the disclosed embodiments.

One or more of the above-described techniques can be implemented in or involve one or more computer systems. FIG. 5 illustrates a generalized example of a computing environment 500. The computing environment 500 is not intended to suggest any limitation as to scope of use or functionality of herein described embodiments.

With reference to FIG. 5, the computing environment 500 includes at least one processing unit 510 and memory 520. In FIG. 5, this basic configuration 530 is included within a dashed line. The processing unit 510 executes computer-executable instructions and can be a real or a virtual processor (e.g., which ultimately is executed on processor hardware). In a multi-processing system, multiple processing units execute computer-executable instructions to increase processing power. The memory 520 can be volatile memory (e.g., registers, cache, RAM), non-volatile memory (e.g., ROM, EEPROM, flash memory, etc.), or some combination of the two. In some embodiments, the memory 520 stores software 580 implementing herein described techniques.

A computing environment can have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 can be removable or non-removable, and includes magnetic disks, magnetic tapes or cassettes, CD-ROMs, CD-RWs, DVDs, or any other medium which can be used to store information and which can be accessed within the computing environment 500. In some embodiments, the storage 540 stores instructions for the software 580.

The input device(s) 550 can be a touch input device such as a keyboard, mouse, pen, trackball, touch screen, or game controller, a voice input device, a scanning device, a digital camera, or another device that provides input to the computing environment 500. The output device(s) 560 can be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other technique.

Implementations can be described in the general context of computer-readable media. Computer-readable media are any available media that can be accessed within a computing environment. By way of example, and not limitation, within the computing environment 500, computer-readable media include memory 520, storage 540, and combinations thereof.

Having described and illustrated the principles of our technologies with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiments shown in software can be implemented in hardware and vice versa.

As will be appreciated by those ordinary skilled in the art, the foregoing example, demonstrations, and method acts can be implemented by suitable code on a processor base system, such as general purpose or special purpose computer. It should also be noted that different implementations of the present technique can perform some or all the acts described herein in different orders or substantially concurrently, that is, in parallel. Furthermore, the functions can be implemented in a variety of programming languages. Such code, as will be appreciated by those of ordinary skilled in the art, can be stored or adapted for storage in one or more tangible machine readable media, such as on memory chips, local or remote hard disks, optical disks or other media, which may be accessed by a processor based system to execute the stored code. For instance, the instructions may be electronically captured via optical scanning of a medium, then compiled, interpreted or otherwise processed in a suitable manner if appropriate, and then stored in a computer memory.

Any of the methods described herein can be implemented by computer-executable instructions stored in one or more computer-readable storage devices (e.g., memory, magnetic storage, optical storage, or the like). Such instructions can cause a computer to perform the method.

Additionally, some embodiments of the disclosed technology include a Computer Program Product (CPP) for use with a computer. The CPP can include a computer-readable medium having computer-executable program code embodied therein. Such program code can cause a computer to perform any of the methods described herein.

This description is presented to enable a person of ordinary skill in the art to make and use the described technologies and is provided in the context of the requirement for a obtaining a patent. The present description is the best presently-contemplated method for carrying out the herein described technologies. Principles of the described technologies can be applied to other embodiments, and some features of the described technologies can be used without the corresponding use of other features. Accordingly, the technologies are not intended to be limited to the embodiments shown but are to be accorded the widest scope consistent with the principles and features described herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims and their equivalents.

We claim:

1. A method for providing a voice-based digital signature service, via program instructions stored in a memory and executed by a processing unit, the method comprising:
    sending, by a first user via the processing unit:
        a document to a second user; and
        a personal identification number (PIN) to the second user and to a voice verification authority;
    sending, by the second user via the processing unit to the voice verification authority, a voice recording comprising at least the PIN and a consent of the second user to the PIN;
    comparing, by the voice verification authority via the processing unit, the voice recording with a predefined voice sample of the second user, and the PIN received from the first user with the PIN received from the second user; and
    signing, by the signing entity via the processing unit, the PIN with a private key associated with the second user, on receiving a notification from the voice verification authority.

2. The method of claim 1, wherein the sending the document to the second user by the first user is preceded by the registering the second user with the voice verification authority.

3. The method of claim 1, wherein the PIN is a hash generated on the document using a one way hash function.

4. The method of claim 1, wherein the document and PIN are communicated through one of a plurality of electronic channels.

5. The method of claim 1, wherein the voice recording further comprises details such as a time, a date, or a name of the second user.

6. The method of claim 1, wherein a notification is sent by the voice verification authority to the signing entity for signing the document on successful match of:
    the voice recording with a predefined voice sample of the second user; and the PIN received from the first user with the PIN received from the second user.

7. The method of claim 1, further comprising sending an acknowledgement by the signing entity that the document has been signed on behalf of the second user, to the first user and to the second user.

8. The method of claim 1, wherein the first user verifies the signature on the document performed by the signing entity using a known public key of the second user.

9. A system for providing a voice-based digital signature service, the system comprising:
    a voice verification authority comprising:
        a database, configured to store voice samples of one or more registered users;
        an authentication module, configured to:
            receive a personal identification number (PIN) from a first user, and a voice recording comprising at least the PIN and a consent of a second user to the PIN;
            compare the voice recording with a predefined voice sample of the second user, and the PIN received from the first user with the PIN received from the second user; and
            send a notification to a signing entity based on the comparison; and
    a signing entity configured to:
        sign the PIN with a private key associated with the second user, on receiving the notification from the authentication module; and
        send an acknowledgement that the document has been signed to the first user and to the second user.

10. The system of claim 9, further comprising a registration module configured to register one or more users with the voice verification authority.

11. The system of claim 9, wherein the signing entity comprises a database storing a private key associated with respective registered users of the one or more registered users.

12. The system of claim 9, wherein the PIN is generated on the document using a one way hash function.

13. The system of claim 9, wherein the acknowledgement sent by the signing entity comprises the signed PIN.

14. A computer program product for use with a computer, the computer program product comprising a non-transitory computer-readable medium having a computer-executable program code embodied therein for providing a voice-based digital signature service, the computer-executable program code storing a set of instructions configured for:
    sending, by a first user:
        a document to a second user; and
        a personal identification number (PIN) to the second user and to a voice verification authority;

sending, by the second user to the voice verification authority, a voice recording comprising at least the PIN and a consent of the second user to the PIN;

comparing, by the voice verification authority, the voice recording with a predefined voice sample of the second user, and the PIN received from the first user with the PIN received from the second user;

signing, by the signing entity, the PIN with a private key associated with the second user, on receiving a notification from the voice verification authority.

15. The computer program product of claim 14, wherein the PIN is a hash that is generated on the document using a one way hash function.

16. The computer program product of claim 14, wherein the voice recording further comprises details such as a time, a date, or a name of the second user.

17. The computer program product of claim 14, wherein the first user verifies the signature on the document performed by the signing entity using a known public key of the second user.

* * * * *